(12) United States Patent
Cetintas et al.

(10) Patent No.: US 11,748,772 B2
(45) Date of Patent: Sep. 5, 2023

(54) HIERARCHY AWARE GRAPH REPRESENTATION LEARNING

(71) Applicant: Verizon Media Inc., New York, NY (US)

(72) Inventors: Suleyman Cetintas, Cupertino, CA (US); Pengyang Wang, Orlando, FL (US)

(73) Assignee: Yahoo Assets LLC, New York, NY (US)

(*) Notice: Subject to any disclaimer, the term of this patent is extended or adjusted under 35 U.S.C. 154(b) by 112 days.

(21) Appl. No.: 17/173,379

(22) Filed: Feb. 11, 2021

(65) Prior Publication Data

US 2022/0256002 A1    Aug. 11, 2022

(51) Int. Cl.
*G06Q 30/0202* (2023.01)
*H04L 67/50* (2022.01)

(52) U.S. Cl.
CPC ........ *G06Q 30/0202* (2013.01); *H04L 67/535* (2022.05)

(58) Field of Classification Search
None
See application file for complete search history.

(56) References Cited

U.S. PATENT DOCUMENTS

2006/0288023 A1* 12/2006 Szabo .................. G06F 16/10
2012/0254099 A1* 10/2012 Flinn ................... G06F 40/253
706/52
2020/0019984 A1* 1/2020 Yuan ..................... G06N 7/005
2020/0250234 A1* 8/2020 Teofili ................ G06F 16/9024
2021/0182259 A1* 6/2021 Erler ................... G06F 16/2246

OTHER PUBLICATIONS

Shi et al, "User Interface Layout Recommendation Based on Pairing Model," 2018 7th International Conference on Digital Home (ICDH), Guilin, China, 2018, pp. 187-192 (Year: 2018).*
Baral et al., "HiRecS: A Hierarchical Contextual Location Recommendation System," in IEEE Transactions on Computational Social Systems, vol. 6, No. 5, pp. 1020-1037, Oct. 2019 (Year: 2019).*

* cited by examiner

*Primary Examiner* — Chesiree A Walton
(74) *Attorney, Agent, or Firm* — Cooper Legal Group LLC

(57) ABSTRACT

A method includes executing operations to generate a first enhancement function based on a parent-child link in a content hierarchy including a link between a parent node in a first level of the content hierarchy to a child node in a second level of the content hierarchy below the first level. A second enhancement function is generated based on a sibling link in the content hierarchy including a link between a sibling node in a third level of the content hierarchy and a sibling node in the third level of the content hierarchy sharing a common parent node with the first sibling node in a fourth level of the content hierarchy above the third level. A user content consumption metric is generated based on the first and second enhancement functions. A content list including a set of candidate content items ranked based on the user content consumption metric is generated.

20 Claims, 7 Drawing Sheets

HIERARCHY AWARE GRAPH REPRESENTATION LEARNING

BACKGROUND

Graph representation learning methods are used to generate effective representations for graph-structured data, leading to significant performance improvements in downstream tasks. Current techniques model the global and/or local structures by exploiting relationships in K-order proximities (K-hop neighbors).

SUMMARY

In accordance with the present disclosure, one or more computing devices and/or methods are provided. In an example, a method includes executing, on a processor of a computing device, instructions that cause the computing device to perform operations. The operations include generating a first enhancement function based on a parent-child link in a content hierarchy. The parent-child link includes a link between a parent node in a first level of the content hierarchy to a child node in a second level of the content hierarchy below the first level. A second enhancement function is generated based on a sibling-sibling link in the content hierarchy. The sibling-sibling link includes a link between a first sibling node in a third level of the content hierarchy and a second sibling node in the third level of the content hierarchy sharing a common parent node with the first sibling node in a fourth level of the content hierarchy above the third level. A user content consumption metric is generated based on the first enhancement function and the second enhancement function. A content list including a set of candidate content items ranked based on the user content consumption metric is generated.

In an example, a computing device includes a processor and memory comprising processor-executable instructions that when executed by the processor cause performance of operations. The operations include enhancing mutual information metrics based on a parent-child link in a content hierarchy to generate enhanced mutual information metrics. The parent-child link includes a link between a parent node in a first level of the content hierarchy to a child node in a second level of the content hierarchy below the first level. The operations include enhancing similarity metrics based on a sibling-sibling link in the content hierarchy to generate enhanced similarity metrics. The sibling-sibling link includes a link between a first sibling node in a third level of the content hierarchy and a second sibling node in the third level of the content hierarchy sharing a common parent node with the first sibling node in a fourth level of the content hierarchy above the third level. The operations include enhancing hop metrics based on nodes in the content hierarchy to generate enhanced hop metrics. The operations include generating a user content consumption metric based on the enhanced mutual information metrics, the enhanced similarity metrics, and the enhanced hop metrics and generating a content list including a set of candidate content items ranked based on the user content consumption metric.

In an example, a non-transitory machine readable medium having stored thereon processor-executable instructions that when executed cause performance of operations. The operations include generating a first enhancement function based on a relationship between a first node in a first level of a content hierarchy and a second node in a second level of the content hierarchy below the first level. The operations include generating a second enhancement function based on hops between nodes in the content hierarchy. The operations include generating a user content consumption metric based on the first enhancement function and the second enhancement function and generating a content list including a set of candidate content items ranked based on the user content consumption metric.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
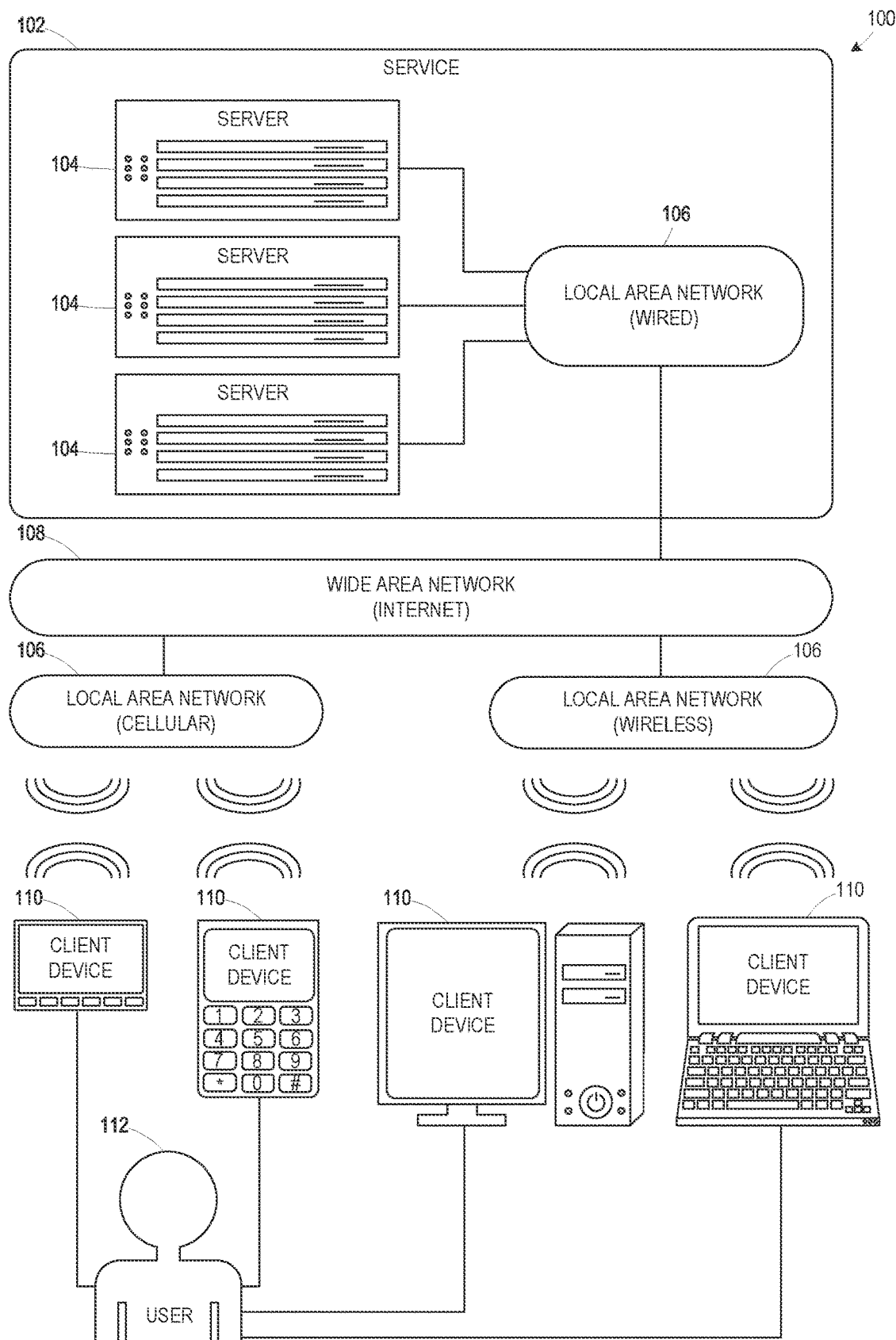
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
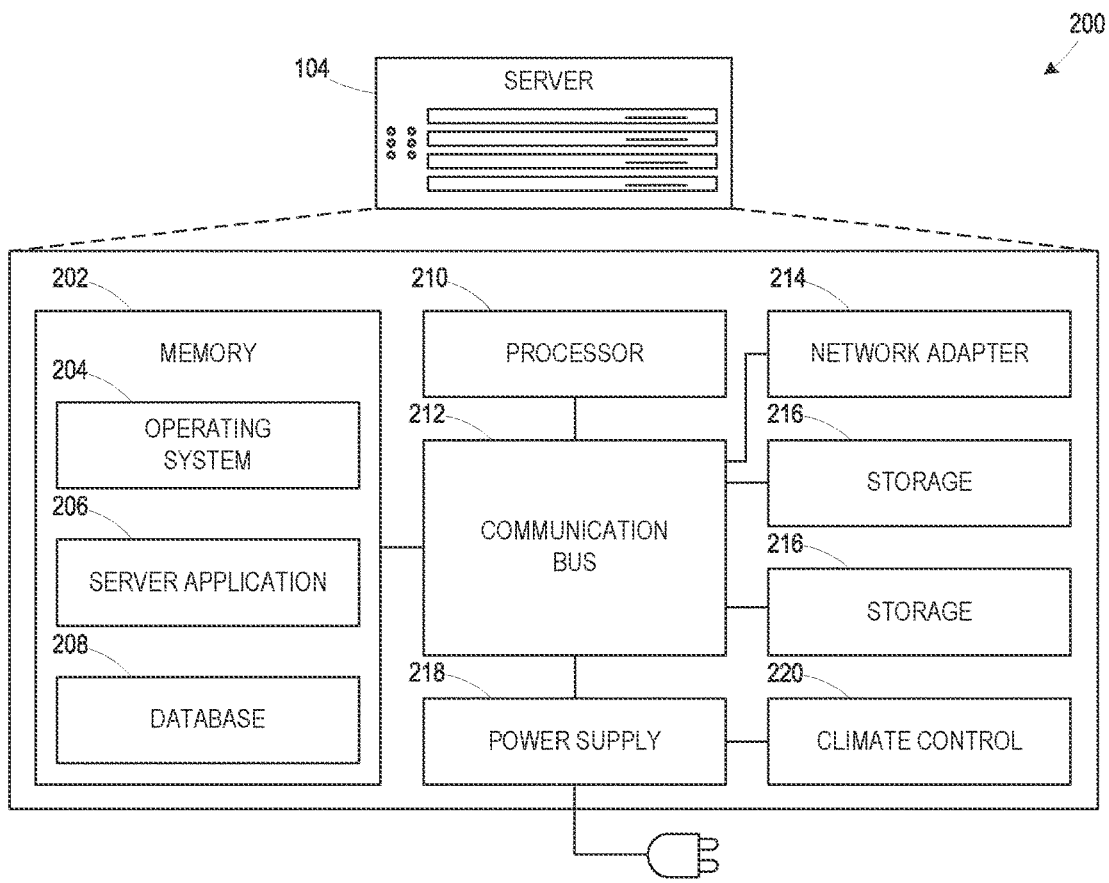
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
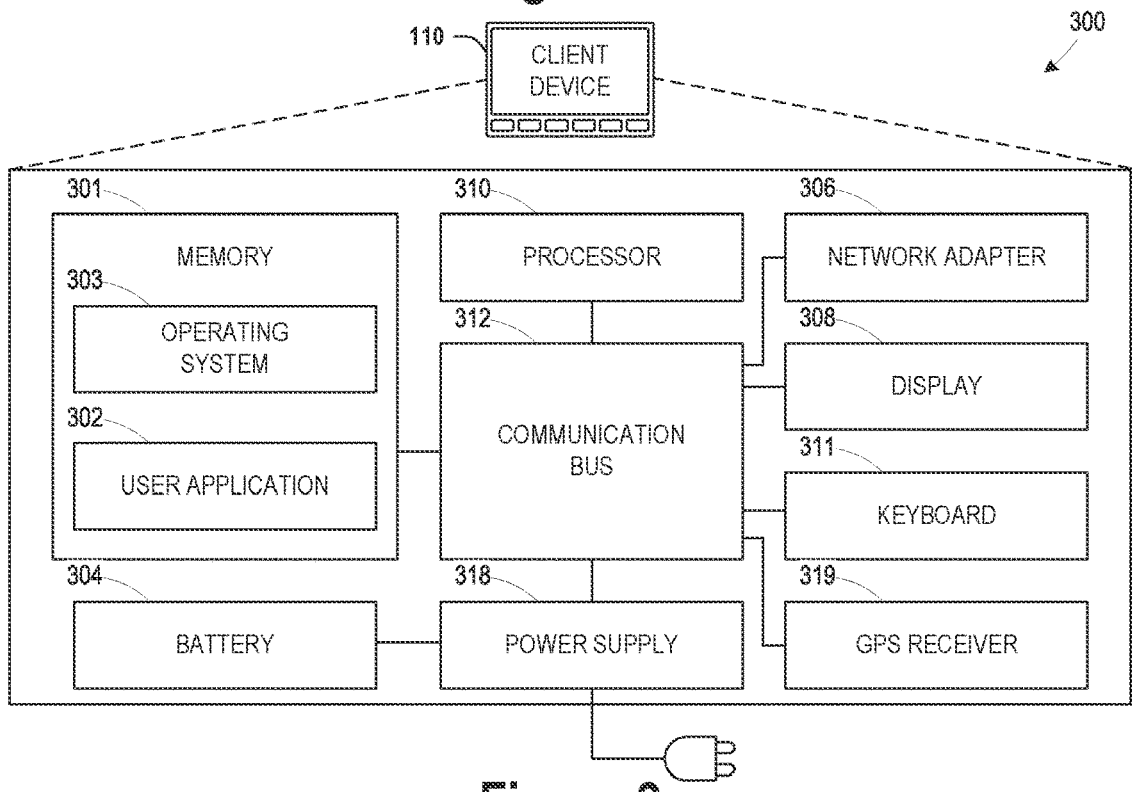
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger, internet browser, and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for evaluating graph representations of content are provided. A system may use a machine learning model to perform one or more actions, such as at least one of one or more classification actions, one or more regression actions, one or more clustering actions, etc. For example, the system may use the machine learning model to output information (e.g., one or more predictions) based upon one or more inputs. The information may be used to provide one or more services (e.g., the information may be used to at least one of select content for presentation to a user, to classify data such as an image, etc.). The one or more inputs may correspond to one or more graphical representations of a content hierarchy, user history information, user location information, or other suitable parameters. In some embodiments, user history information includes user check-in information, user interest information, user preference information, user interaction information, user social network information, user temporal information, or other suitable user history information.

A conventional hop-based enhancement function for graph representation learning (GRL) can be supervised or unsupervised. Supervised GRL exploits downstream task labels (e.g., node classification and link prediction) to model the graph structure, while unsupervised GRL, such as random walk-based methods, learn graph representations without downstream task labels. Both supervised and unsupervised GRL approaches model the global and/or local structure of content hierarchy graphs, such as 500A, 500B illustrated in FIG. 5, by leveraging K proximity (K-hop neighbors) information. These GRL approaches model the content hierarchy 500A, 500B graph structures by exploiting neighbor information, without differentiating parents and children in the hierarchy from neighbors. Siblings are considered two-hop neighbors. Conventional hop-based GRL techniques are known in the art and are not described in detail herein to avoid obscuring the present subject matter. Example, hop-based GRL techniques include supervised techniques: Graph Convolutional Network (GCN), Graph Attention Network (GAT), GraphSAGE, Topology Adaptive Graph Convolutional Network (TAGCN), Simplified Graph Convolutional Network (SGCN), or other suitable techniques, and unsupervised techniques: DeepWalk, metapath2vec or other suitable techniques.

In accordance with one or more of the techniques herein, a first enhancement function associated with a parent-child link in a content hierarchy is generated. A parent-child link comprises a link between a parent node in a first level of the content hierarchy to a child node in a second level of the content hierarchy below the first level. A second enhancement function associated with sibling-sibling links in the content hierarchy is generated. A sibling-sibling link comprises a link between a first sibling node in a third level of the content hierarchy and a second sibling node in the third level of the content hierarchy sharing a common parent node in a fourth level of the content hierarchy above the third level with the first sibling node. A user content consumption metric is generated based on the first enhancement function and the second enhancement function. A content list including a set of candidate content items ranked based on the user content consumption metrics is generated.

Figure 4:
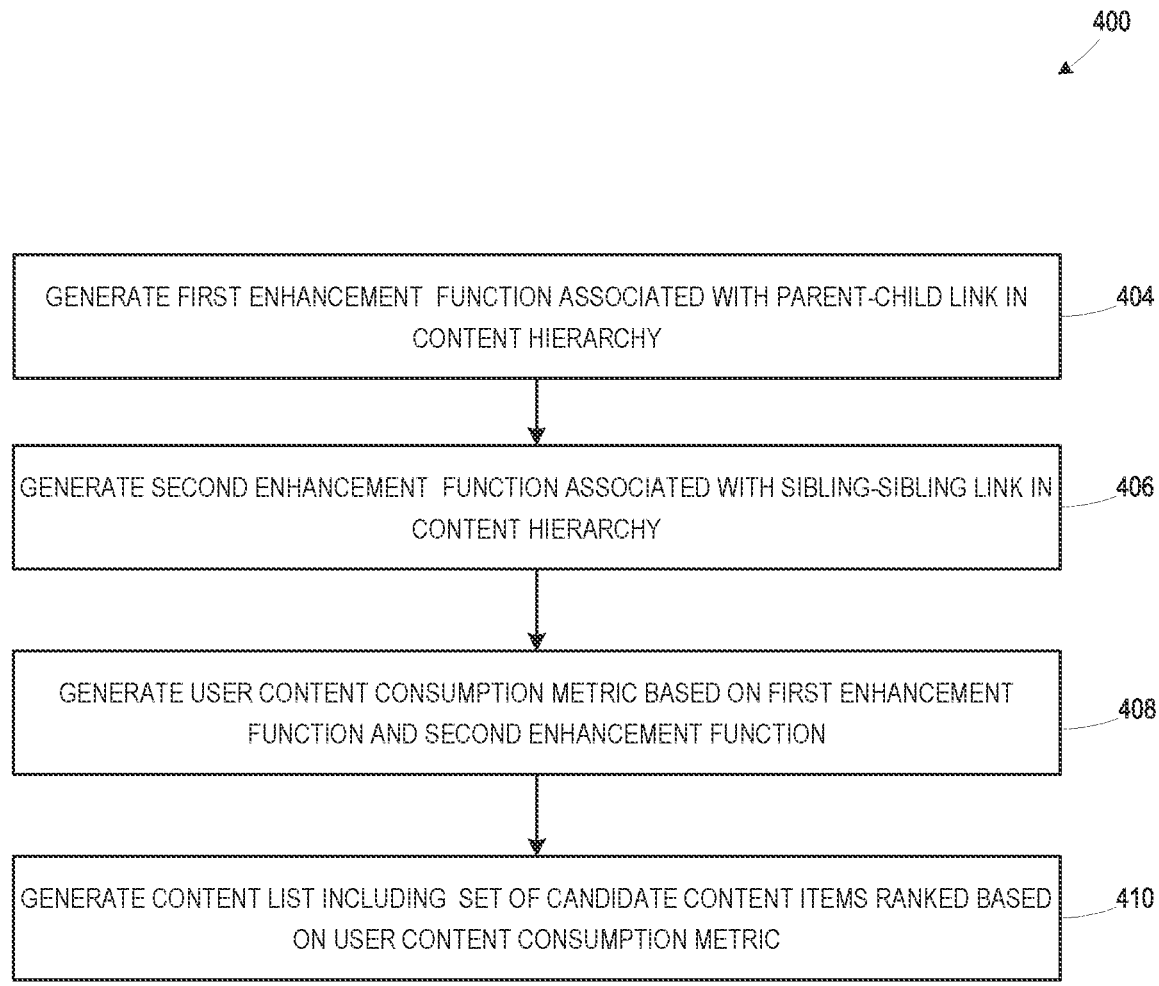
FIG. 4 is a flow chart illustrating an example method for hierarchy aware graph representation learning.
Figure 5:
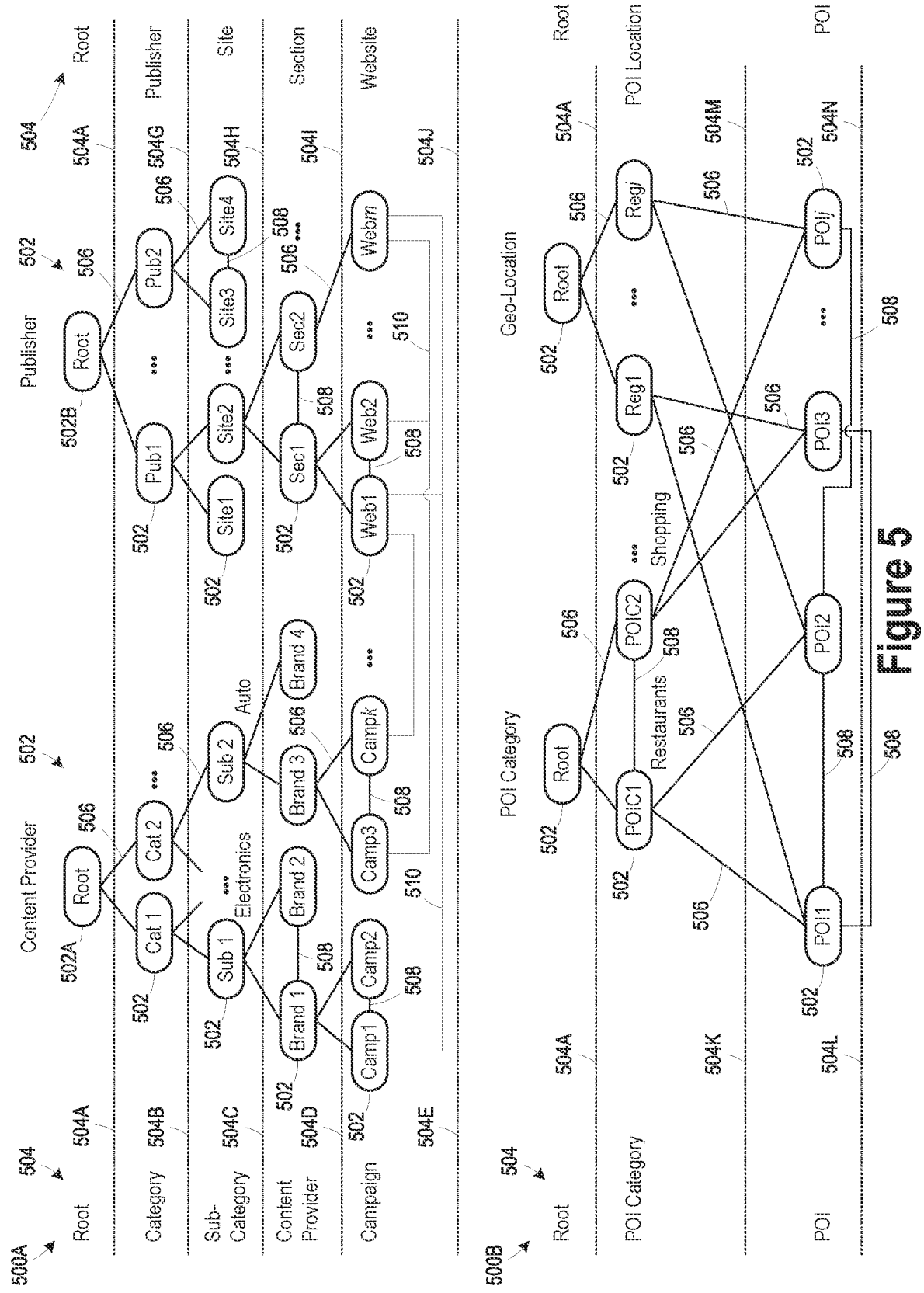
FIG. 5 is a diagram of an embodiment of a content hierarchy.

An embodiment of hierarchy aware graph representation learning (HGRL) is illustrated by an example method 400 of FIG. 4. FIG. 5 is a diagram of an embodiment of content hierarchies 500A, 500B. A system may use one or more machine learning models to select content for presentation to a user using the content hierarchy 500A, 500B. For example, the system may use the one or more machine learning models to output information based upon one or more inputs and/or use the information to provide one or more services.

Referring to FIG. 5, each content hierarchy 500A, 500B comprises nodes 502 arranged in levels 504 with links 506, 508 defined between nodes 502. According to some embodiments, the links 506 represent parent-child links, and the links 508 represent sibling-sibling links. A parent-child link 506 connects a parent node 502 in one level 504 of the content hierarchy 500A, 500B with a child node 502 in a level below the parent node 502. A sibling-sibling link 508 connects two sibling nodes 502 in one level of the content hierarchy 500A, 500B that share a common parent node 502 in a level 504 above the sibling nodes 502. For ease of illustration, not all of the links 505, 508 are illustrated in the content hierarchy 500A, 500B.

In one embodiment, the content hierarchy 500A represents an online content hierarchy for providing information regarding products or services offered by providers. In some embodiments, multiple root nodes 502A, 502B are provided in a root level 504A of the content hierarchy 500A, and the underlying levels 504 may differ based on the particular root node 502A, 502B. In the content hierarchy 500A, the root level 504A includes a content provider root node 502A and a publisher root node 502B. Under the content provider root node 502A, the content hierarchy 500A comprises a category level 504B, a sub-category level 504C, a content provider level 504D, and a campaign level 504E. Under the publisher root node 502B, the content hierarchy 500A comprises a publisher level 504F, a site level 504G, a section level 504H, and a website level 505I. Links 510 connect campaign nodes 502 in the campaign level 504E under the content provider root node 502A and websites nodes 502 in the website level 505I under the publisher root node 502B.

In one embodiment, the content hierarchy 500B represents a point of interest (POI) content hierarchy for providing information regarding points of interest. In some embodiments, multiple root nodes 502C, 502D are provided in the root level 504A of the content hierarchy 500B, and the underlying levels 504 may differ based on the particular root node 502C, 502D. In the content hierarchy 500B, the root level 504A includes a category root node 502C and a location root node 502D. Under the category root node 502C, the content hierarchy 500B comprises a POI category level 504K and a POI level 504L. Under the location root node 502B, the content hierarchy 500B comprises a POI location level 504M, and a POI level 504N. Links 510 connect campaign POI nodes 502 in the POI level 504L under the category root node 502C and POI nodes 502 in the POI level 504L under the location root node 502D.

Other structures and configurations of the content hierarchies 500A, 500B, nodes 502, levels 504, and links 506, 508, 510 are within the scope of the present disclosure.

Returning to FIG. 4, at 404, a first enhancement function associated with a parent-child link 506 in the content hierarchy 500A, 500B is generated. In the content hierarchy 500A, 500B, parent-child relationships generally show significant affiliative correlations. For example, in the content hierarchy 500A, two sub-category nodes 502, such as Cat 1=Electronics and Cat 2=Auto may be provided in the sub-category level 504C. The association between Brand 1 and Electronics (its parent node) is stronger than the association between Brand 1 and Auto even though the hop distance (one level) is the same. In the content hierarchy 500B, two POI category nodes 502, such as POIC1=Restaurants and POIC2=Shopping may be provided in the POI category level 504K. The association between POI1, a restaurant, and Restaurants (its parent node) is stronger than the association between POI1 and Shopping even though the hop distance (one level) is the same.

In some embodiments, a Mutual Information (MI) correlation measure is employed to correlate parent-child links 506. MI evaluates the dependency between two variables using the enhancement function:

$$L_{pc} = -\sum_i E_X[\log D(h_p^{(i)}, h^{(i)})] - E_{\tilde{X}}[\log(1 - D(\tilde{h}_p^{(i)}, h^{(i)}))] \quad (1)$$

where for each node i in the content hierarchy 500A, 500B, $h^{(i)}$ denotes a node, $h_p^{(i)}$ denotes a parent nodes sampled from the positive set, $X$, and $\tilde{h}_p^{(i)}$ denotes non-parent nodes sampled from the negative set, $\tilde{X}$. The non-parent nodes $\tilde{h}_p^{(i)}$ are randomly sampled from the node set that does not include the parent of node i. The positive set X includes pairs $(h_p^{(i)}, h^{(i)})$ and the negative set $\tilde{X}$ includes pairs $(\tilde{h}_p^{(i)}, h^{(i)})$. A discriminator D provides probability scores for the sampled pairs. The enhancement function of Equation 1 represents a loss function. Employing an optimization routine to minimize the enhancement function maximizes the MI between the parent-child relationships represented by the links 506. The terms optimize, minimize, maximize, or the like are not intended to represent absolutes. Typically enhancement operations are performed until some sort of limit is reached, such as convergence, a maximum number of iterations, a maximum computing resource consumption, or some other suitable limit. Hence, the state of the enhancement function when the limit is reached may not represent an absolute enhancement, optimization, loss minimization, or maximization.

At 406, a second enhancement function associated with a sibling-sibling link 508 in the content hierarchy 500A, 500B is generated. In the content hierarchy 500A, 500B, sibling-sibling relationships generally show significant affiliative correlations. For example, in the content hierarchy 500A, two nodes 502 in the campaign level 504E that share the same brand as the parent node 502 in the content provider level 504D have a stronger association than nodes 502 in the campaign level 504E that have different brands as parent nodes 502. In the content hierarchy 500B, two POI nodes 502 in the POI level 504L that have the same region for the parent node 502 in the POI location level 504M have a stronger association than POI nodes 502 with different region parent nodes 502.

In some embodiments, a similarity correlation measure is employed to correlate sibling-sibling links 508. Similarity enhancement relates to the domain of metric learning, which aims at maximizing the similarity between positive pairs, while minimizing the similarity of negative pairs. For each node i in the content hierarchy 500A, 500B, positive pairs ($h_i$, $h_j$) are considered where $h_j$ is sampled from the sibling set of the node i. The similarity of positive samples is defined by the function:

$$f_i = \sum_{j \in Sib(i)} \exp(sim(h_i, h_j)), \qquad (2)$$

where Sib(i) denotes the sibling set of node i. and sim denotes the similarity function. In some embodiments, the enhancement function employs the cosine of the similarity.

Negative samples are defined by the pairs ($h_i$, $h_k$) where $h_k$ is sampled from the non-sibling set of the node i. The non-sibling set is the node set that excludes the siblings of the node i. The similarity of negative samples is defined by the function:

$$g_i = \sum_{k \notin Sib(i)} \exp(sim(h_i, h_k)). \qquad (3)$$

The similarity of sibling relationships is defined by the enhancement function:

$$L_s = -\sum_i \log \frac{f_i}{f_i + g_i}. \qquad (4)$$

When the similarity of positive samples $f_i$ is maximized and the similarity of negative samples $g_i$, is minimized, the enhancement function achieves a minimum value. Thus, minimizing the enhancement function $L_s$ maximizes the similarities between siblings' representations. In some cases, the space of the sibling set and the non-sibling set can be very large, so the siblings and non-siblings may be sampled in some embodiments.

At 408, a user content consumption metric is generated based on the first enhancement function (1) for parent-child relationships and the second enhancement function (4) for sibling-sibling relationships.

A conventional hop-based enhancement function for graph representation learning (GRL) is denoted by $L_o$. In some embodiments, a unified enhancement function is defined by:

$$L = \lambda_0 L_0 + \lambda_{pc} L_{pc} + \lambda_s L_s$$

$$(\lambda_0 + \lambda_{pc} + \lambda_s = 1) \qquad (5)$$

where $\lambda_0$, $\lambda_{pc}$, $\lambda_s$ denote weights assigned to the enhancement functions for the conventional hop-based enhancement function (described above), $L_o$, the parent-child MI enhancement function, $L_{pc}$, and the sibling-sibling similarity enhancement function, $L_s$, respectively.

Figure 6:
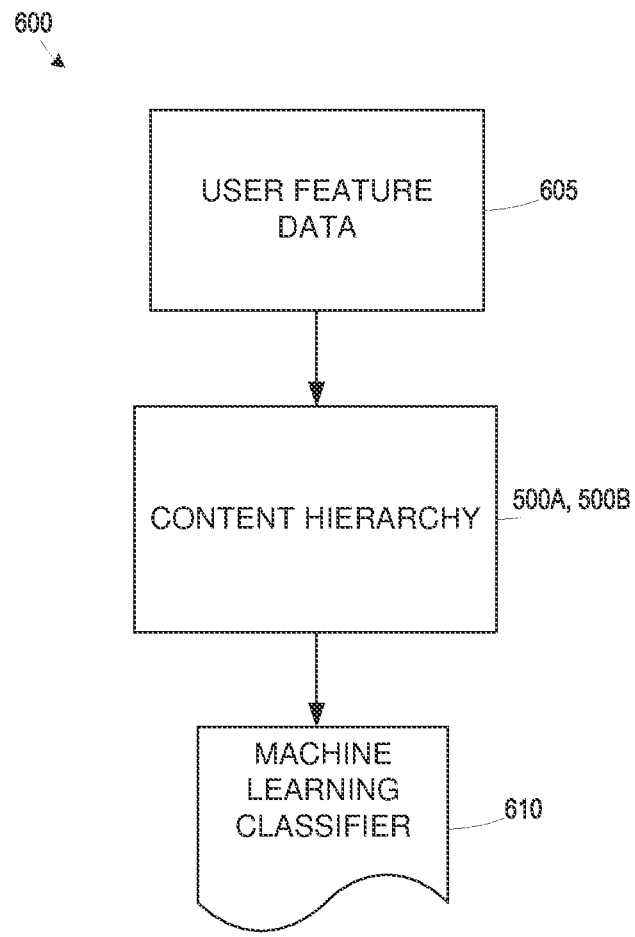
FIG. 6 is a component block diagram illustrating an example system for hierarchy aware graph representation learning.

FIG. 6 is a component block diagram illustrating an example system 600 for hierarchy aware graph representation learning described with respect to the method 400 of FIG. 4 and the content hierarchy 500A, 500B described with respect to FIG. 5. In an example, user feature data 605 and the content hierarchy 500A, 500B may be input to a machine learning classifier 610. In some embodiments, the machine learning classifier 610 comprises a multilayer fully connected neural network.

In some embodiments, the machine learning classifier 610 employs the unified enhancement function (5) to generate user content consumption metrics, such as POI metrics using the content hierarchy 500B or content interest using the content hierarchy 500A. In one example, the content hierarchy 500A is employed to evaluate a user's potential interest in content. In another example, the content hierarchy 500B is employed to evaluate a user's interest in a particular POI. The content hierarchy 500A, 500B is evaluated by considering the user feature data 605. In some embodiments, user feature data 605 includes data about the user such as user history, user location, or other suitable information. For example, user feature data 605 may comprise structured data indicative of one or more features associated with the user and/or a device used by the user. The one or more features may comprise at least one of one or more features corresponding to activity of the device, one or more features corresponding to one or more demographic parameters of the user, one or more features corresponding to one or more content items consumed via the device, one or more features corresponding to one or more internet resources accessed via the device, etc. In some examples, information of the user profile (and/or other information associated with the user and/or the device) may be processed, such as in a feature engineering pipeline, to generate user profile information.

The machine learning classifier 610 generates user content consumption metrics using the user feature data 605 and the unified enhancement function (5). For example, the machine learning classifier 610 predicts whether the user is interested in a content item or a POI by generating a probability that the user selects (e.g., clicks) a content or POI item in response to presenting the content item via the device, etc. In an example, a content item or POI may be selected based upon the determined information and/or the content item may be presented and/or recommended via the device based upon the selection. One or more of the techniques provided herein may be performed in response to receiving a request to perform an action and/or provide a service. An example user consumption metric is a click-through rate (CTR) metric representing a probability that a user will select a POI or click on a content item.

Figure 7:
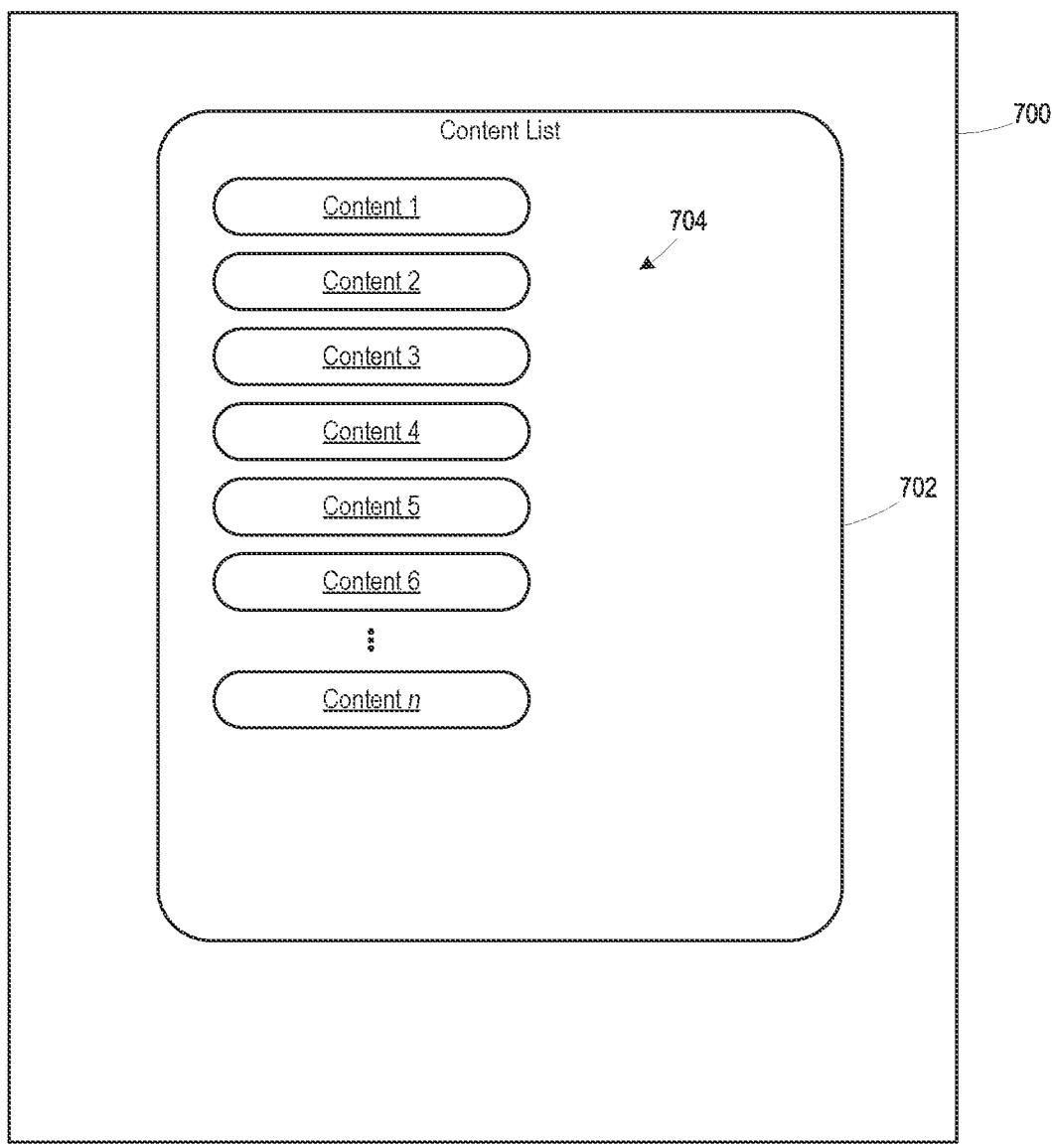
FIG. 7 is a diagram illustrating an example interface for displaying user content items.

FIG. 7 is a diagram illustrating an example interface 700 for displaying user content items. At 410, a content list 702 including a set of candidate content items 704 ranked based on the user content consumption metric is presented on the interface 700. In some embodiments, the set includes the candidate content items having probabilities greater than a threshold. The machine learning classifier 610 evaluates the candidate content or POI items in the content hierarchy 500A, 500B using the unified enhancement function (5) to rank the candidate content items 704 and present the ranked content list 702 on the interface 700. In some embodiments, the interface 700 allows the user to select a candidate content item 704 to retrieve the associated content. In some embodiments, the content list 702 only includes the highest ranked candidate content items 704

In some examples, one or more of the techniques provided herein may be performed within a mobile edge computing network architecture and/or a multi-access edge computing (MEC) network architecture. One or more computing programs and/or data associated with performing one or more of the techniques provided herein may be deployed at a network node, such as a cellular base station and/or a different edge node. In an example, the network node may be connected (e.g., directly connected and/or indirectly connected) to one or more devices. The network node may provide cellular coverage to the one or more devices within a coverage area of the network node. The network node may be closer to the one or more devices than a core network. The generating of the user content consumption metrics at block 408 and the generating of the content list 702 at block 410 may be performed using a computer system at the network node.

In an example, the machine learning classifier 610 may be used by the computer system at the network node to provide one or more services to the one or more devices. In response to receiving a content request, the machine learning classifier 610 may be used (by the computer system, for example) to generate the content list 702.

Implementation of at least some of the disclosed subject matter may lead to benefits including, providing content of increased value to the user, providing content of increased value to the content provider, increased user satisfaction, or decreased user effort.

In some examples, at least some of the disclosed subject matter may be implemented on a client device, and in some examples, at least some of the disclosed subject matter may be implemented on a server (e.g., hosting a service accessible via a network, such as the Internet).

Figure 8:
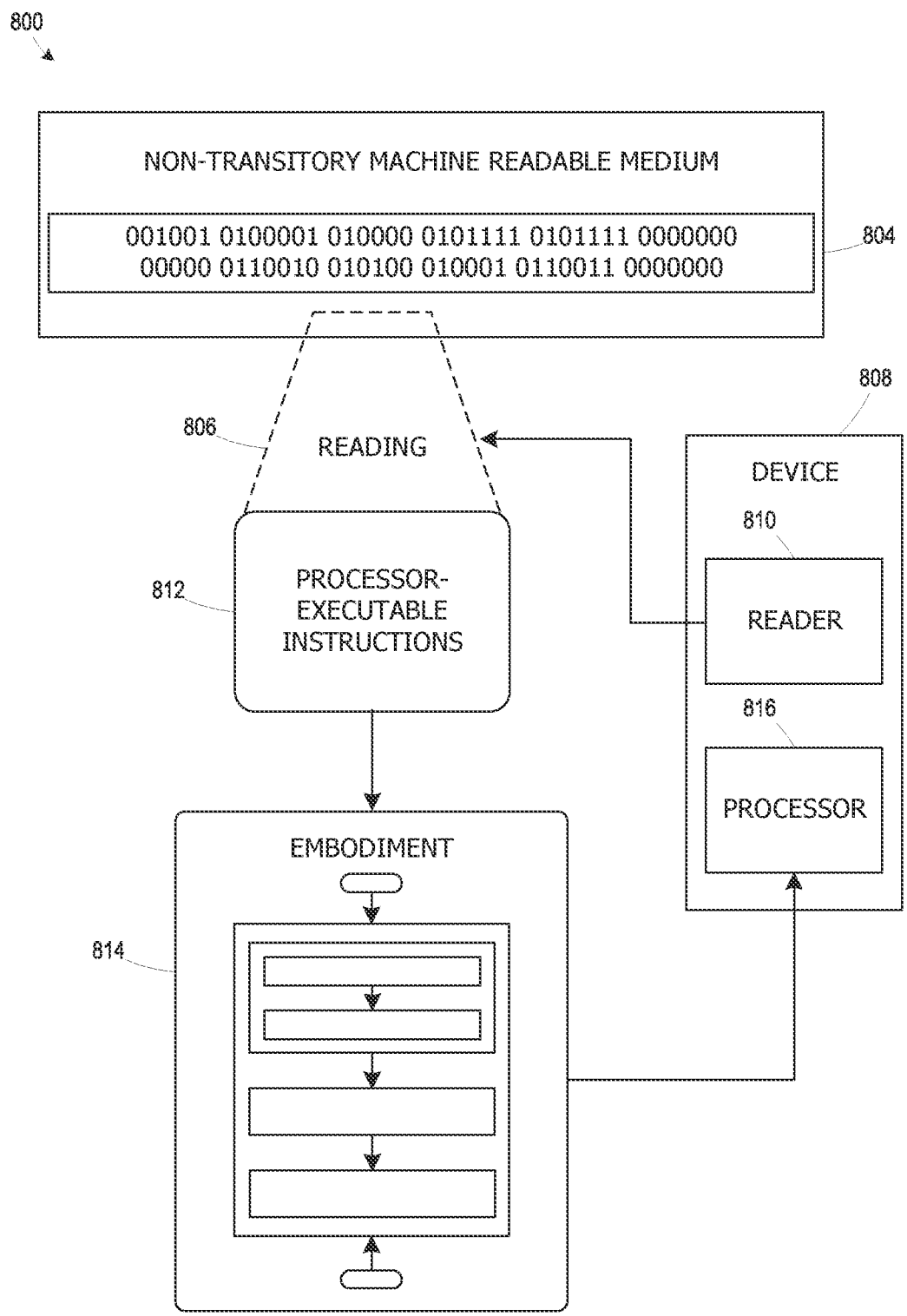
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814). The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed, cause performance of operations, such as at least some of the example method 400 of FIG. 4, for example. In some embodiments, the processor-executable instructions 812 are configured to cause implementation of a system, such as at least some of the example system 600 of FIG. 6, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for hierarchy-aware graph representation learning, comprising:
executing, on a processor of a computing device, instructions that cause the computing device to perform operations, the operations comprising:
generating a first enhancement function for graph representation learning based on a parent-child link in a content hierarchy, wherein the parent-child link comprises a link between a parent node in a first level of the content hierarchy to a child node in a second level of the content hierarchy below the first level, wherein the first enhancement function corresponds to a combination of at least a first calculation associated with parent nodes sampled from a positive set and a second calculation associated with non-parent nodes sampled from a negative set;
generating a second enhancement function for graph representation learning based on a sibling-sibling link in the content hierarchy, wherein the sibling-sibling link comprises a link between a first sibling node in a third level of the content hierarchy and a second sibling node in the third level of the content hierarchy sharing a common parent node with the first sibling node in a fourth level of the content hierarchy above the third level, wherein the second enhancement function corresponds to a combination of at least a third calculation associated with a similarity of positive samples of a sibling set and a fourth calculation associated with a similarity of negative samples of a non-sibling set;
inputting at least one of user feature data or one or more content hierarchies to a machine learning classifier comprising a neural network;
using the machine learning classifier, comprising the neural network, to generate a user content consumption metric based on the first enhancement function corresponding to the parent-child link and the second enhancement function corresponding to the sibling-sibling link; and
controlling a graphical user interface to display a content list including a set of candidate content items ranked based on the user content consumption metric.

2. The method of claim 1, wherein generating the user content consumption metric comprises:
generating point-of-interest metrics; and
generating the user content consumption metric based on the point-of-interest metrics.

3. The method of claim 1, wherein generating the user content consumption metric comprises:
generating click-through rate metrics; and
generating the user content consumption metric based on the click-through rate metrics.

4. The method of claim 1, wherein generating the user content consumption metric comprises:
generating a unified enhancement function based on the first enhancement function and the second enhancement function; and
generating the user content consumption metric based on the unified enhancement function.

5. The method of claim 1, wherein generating the user content consumption metric comprises:
generating a unified enhancement function based on the first enhancement function, the second enhancement function, and a third enhancement function based on hop distances between nodes in the content hierarchy; and
generating the user content consumption metric based on the unified enhancement function.

6. The method of claim 1, wherein generating the user content consumption metric comprises:
assigning a first weight to the first enhancement function to generate a first weighted enhancement function;
assigning a second weight to the second enhancement function to generate a second weighted enhancement function;
assigning a third weight to a third enhancement function to generate a third weighted enhancement function, wherein the third enhancement function is based on hop distances between nodes in the content hierarchy;
generating a unified enhancement function based on the first weighted enhancement function, the second weighted enhancement function, and the third weighted enhancement function; and
generating the user content consumption metric based on the unified enhancement function.

7. The method of claim 1, wherein generating the first enhancement function comprises:
generating a loss function based on a first set of parent-child nodes and a second set of non-parent nodes; and
generating the first enhancement function based on the loss function.

8. The method of claim 1, wherein generating the second enhancement function comprises:
generating a loss function based on a first set of sibling-sibling nodes and a second set of non-sibling nodes; and
generating the second enhancement function based on the loss function.

9. A computing device comprising:
a processor; and
memory comprising processor-executable instructions that when executed by the processor cause performance of operations for hierarchy-aware graph representation learning, the operations comprising:
enhancing mutual information metrics for graph representation learning based on a parent-child link in a content hierarchy to generate enhanced mutual information metrics, wherein the parent-child link comprises a link between a parent node in a first level of the content hierarchy to a child node in a second level of the content hierarchy below the first level, wherein the enhanced mutual information metrics correspond to a combination of at least a first calculation associated with parent nodes sampled from a positive set and a second calculation associated with non-parent nodes sampled from a negative set;
enhancing similarity metrics for graph representation learning based on a sibling-sibling link in the content hierarchy to generate enhanced similarity metrics, wherein the sibling-sibling link comprises a link between a first sibling node in a third level of the content hierarchy and a second sibling node in the third level of the content hierarchy sharing a common parent node with the first sibling node in a fourth level of the content hierarchy above the third level, wherein the enhanced similarity metrics correspond to a combination of at least a third calculation associated with a similarity of positive samples of a sibling set and a fourth calculation associated with a similarity of negative samples of a non-sibling set;
enhancing hop metrics based on nodes in the content hierarchy to generate enhanced hop metrics;
inputting at least one of user feature data or one or more content hierarchies to a machine learning classifier comprising a neural network;
using the machine learning classifier, comprising the neural network, to generate a user content consumption metric based on the enhanced mutual information metrics, the enhanced similarity metrics, and the enhanced hop metrics; and
controlling a graphical user interface to display a content list including a set of candidate content items ranked based on the user content consumption metric.

10. The computing device of claim 9, wherein:
the user content consumption metric comprises a point-of-interest metric.

11. The computing device of claim 9, wherein:
the user content consumption metric comprises a click-through rate metric.

12. The computing device of claim 9, wherein generating the user content consumption metric comprises:
generating a unified enhancement function based on the enhanced mutual information metrics, the enhanced similarity metrics, and the enhanced hop metrics; and
generating the user content consumption metric based on the unified enhancement function.

13. The computing device of claim 9, wherein generating the user content consumption metric comprises:
assigning a first weight to the enhanced mutual information metrics to generate weighted enhanced mutual information metrics;
assigning a second weight to the enhanced similarity metrics to generate weighted enhanced similarity metrics;
assigning a third weight to the enhanced hop metrics to generate weighted enhanced hop metrics;
generating a unified enhancement function based on the weighted enhanced mutual information metrics, the weighted enhanced similarity metrics, and the weighted enhanced hop metrics; and
generating the user content consumption metric based on the unified enhancement function.

14. The computing device of claim 9, wherein the operations comprise:
generating the mutual information metrics using a loss function based on a first set of parent-child nodes and a second set of non-parent nodes.

15. The computing device of claim 9, wherein the operations comprise:
generating the mutual information metrics using a loss function based on a first set of sibling-sibling nodes and a second set of non-sibling nodes.

16. A non-transitory machine readable medium having stored thereon processor-executable instructions that when executed cause performance of operations for hierarchy-aware graph representation learning, the operations comprising:
generating a first enhancement function for graph representation learning based on a relationship between a first node in a first level of a content hierarchy and a second node in a second level of the content hierarchy below the first level, wherein the first enhancement function corresponds to a combination of at least a first calculation associated with parent nodes sampled from a positive set and a second calculation associated with non-parent nodes sampled from a negative set;
generating a second enhancement function for graph representation learning based on hops between nodes in the content hierarchy, wherein the second enhancement function corresponds to a combination of at least a third calculation associated with a similarity of positive samples of a sibling set and a fourth calculation associated with a similarity of negative samples of a non-sibling set;
inputting at least one of user feature data or one or more content hierarchies to a machine learning classifier comprising a neural network;
using the machine learning classifier, comprising the neural network, to generate a user content consumption metric based on the first enhancement function and the second enhancement function; and
controlling a graphical user interface to display a content list including a set of candidate content items ranked based on the user content consumption metric.

17. The non-transitory machine readable medium of claim 16, wherein:
the relationship between the first node and the second node comprises a relationship between a parent node in the first level to a child node in the second level.

18. The non-transitory machine readable medium of claim 16, wherein generating the user content consumption metric comprises:
generating a unified enhancement function based on the first enhancement function and the second enhancement function; and
generating the user content consumption metric based on the unified enhancement function.

19. The non-transitory machine readable medium of claim 16, wherein:
the user content consumption metric comprises a point-of-interest metric.

20. The non-transitory machine readable medium of claim 16, wherein:
the user content consumption metric comprises a click-through rate metric.

* * * * *